United States Patent [19]
Yamashita et al.

[11] Patent Number: 5,446,669
[45] Date of Patent: Aug. 29, 1995

[54] METHOD AND APPARATUS FOR MANAGING A MACHINING SYSTEM

[75] Inventors: Yasuhiro Yamashita, Okazaki; Kunpei Manabe, Nagoya; Atsuhisa Asada, Obu, all of Japan

[73] Assignee: Toyoda Koki Kabushiki Kaisha, Kariya, Japan

[21] Appl. No.: 806,325

[22] Filed: Dec. 13, 1991

[30] Foreign Application Priority Data

Dec. 26, 1990 [JP] Japan .................................. 2-406354

[51] Int. Cl.6 .............................................. G06F 15/46
[52] U.S. Cl. ..................... 364/468; 364/478; 364/474.11
[58] Field of Search ............... 364/468, 478, 479, 401, 364/403, 474.11, 474.15, 474.16, 131, 138

[56] References Cited

U.S. PATENT DOCUMENTS

| | | | |
|---|---|---|---|
| 4,564,102 | 1/1986 | Mori et al. | 364/478 |
| 4,630,216 | 12/1986 | Tyler et al. | 364/478 |
| 4,669,047 | 5/1987 | Chucta | 364/468 |
| 5,177,688 | 1/1993 | Rentschler et al. | 364/468 |
| 5,193,065 | 3/1993 | Guerindon et al. | 364/468 |
| 5,233,534 | 8/1993 | Osthus et al. | 364/468 |

FOREIGN PATENT DOCUMENTS

| | | |
|---|---|---|
| 0003024 | 7/1979 | European Pat. Off. . |
| 0332711 | 9/1989 | European Pat. Off. . |
| 03921619 | 1/1990 | Germany . |
| 63-22252 | 1/1988 | Japan . |
| 63-22253 | 1/1988 | Japan . |

Primary Examiner—Roy N. Envall, Jr.
Assistant Examiner—Thomas E. Brown
Attorney, Agent, or Firm—Oblon, Spivak, McClelland, Maier & Neustadt

[57] ABSTRACT

A machining system having a workpiece storage for storing plural workpieces to be machined each of which are machined in plural machining stages. A computer of the system memorizes first information indicating the membership of plural machine tools in plural machine groups suitable for plural different machinings, and second information indicating plural machining stages for machining each of the workpieces and machine groups which can carry out the machinings in respective machining stages. When one of the machine tools becomes empty, the computer finds out what kind of machining is required in the next machining stage of each workpiece so as to find a workpiece which can be machined by a machine group to which the empty machine tool belongs, and the found workpiece is then transferred to the empty machine tool.

12 Claims, 6 Drawing Sheets

MIT

| MACHINE GROUP | MACHINES |
|---|---|
| 1 | MT1, MT2, MT3, MT4 |
| 2 | MT1, MT2 |
| 3 | MT3, MT4 |
| 4 | MT1 |
| . | . |
| . | . |

WIT

| WORK No. | PART No. | POSTURE | STAGE | MACHINE GROUP | NC DATA |
|---|---|---|---|---|---|
| 01 | 111-111 | 1 | 1 | 01 | Q1101 |
|   |   |   | 2 | 02 | Q1201 |
|   |   |   | 3 | 03 | Q1301 |
|   |   | 2 | 1 | 01 | Q2101 |
|   |   |   | 2 | 02 | Q2201 |
|   |   |   | 3 | 04 | Q2301 |
| 02 | 222-222 | 1 | 1 | 01 | Q1101 |
|   |   |   | 2 | 03 | Q1102 |
|   |   |   | 3 | 04 | Q1103 |

FIG. 2

| MACHINE GROUP | MACHINES |
|---|---|
| 1 | MT1, MT2, MT3, MT4 |
| 2 | MT1, MT2 |
| 3 | MT3, MT4 |
| 4 | MT1 |
| .. | .. |

MIT

FIG. 3

| WORK No. | PART No. | POSTURE | STAGE | MACHINE GROUP | NC DATA |
|---|---|---|---|---|---|
| 01 | 111-111 | 1 | 1 | 01 | Q1101 |
|  |  |  | 2 | 02 | Q1201 |
|  |  |  | 3 | 03 | Q1301 |
|  |  | 2 | 1 | 01 | Q2101 |
|  |  |  | 2 | 02 | Q2201 |
|  |  |  | 3 | 04 | Q2301 |
| 02 | 222-222 | 1 | 1 | 01 | Q1101 |
|  |  |  | 2 | 03 | Q1102 |
|  |  |  | 3 | 04 | Q1103 |

WIT

FIG. 4

| ST No. | BS1 | BS2 | BS3 | BS4 | ... | BSn |
|---|---|---|---|---|---|---|
| WP No. | 01 | 02 | 02 | 01 | ... | 02 |
| POSTURE | 1 | 1 | 1 | 2 | ... | 1 |
| STAGE | 2 | 3 | 1 | 3 | ... | * |
| PRIORITY | 1 | 3 | 4 | 2 | ... | * |

WSIT

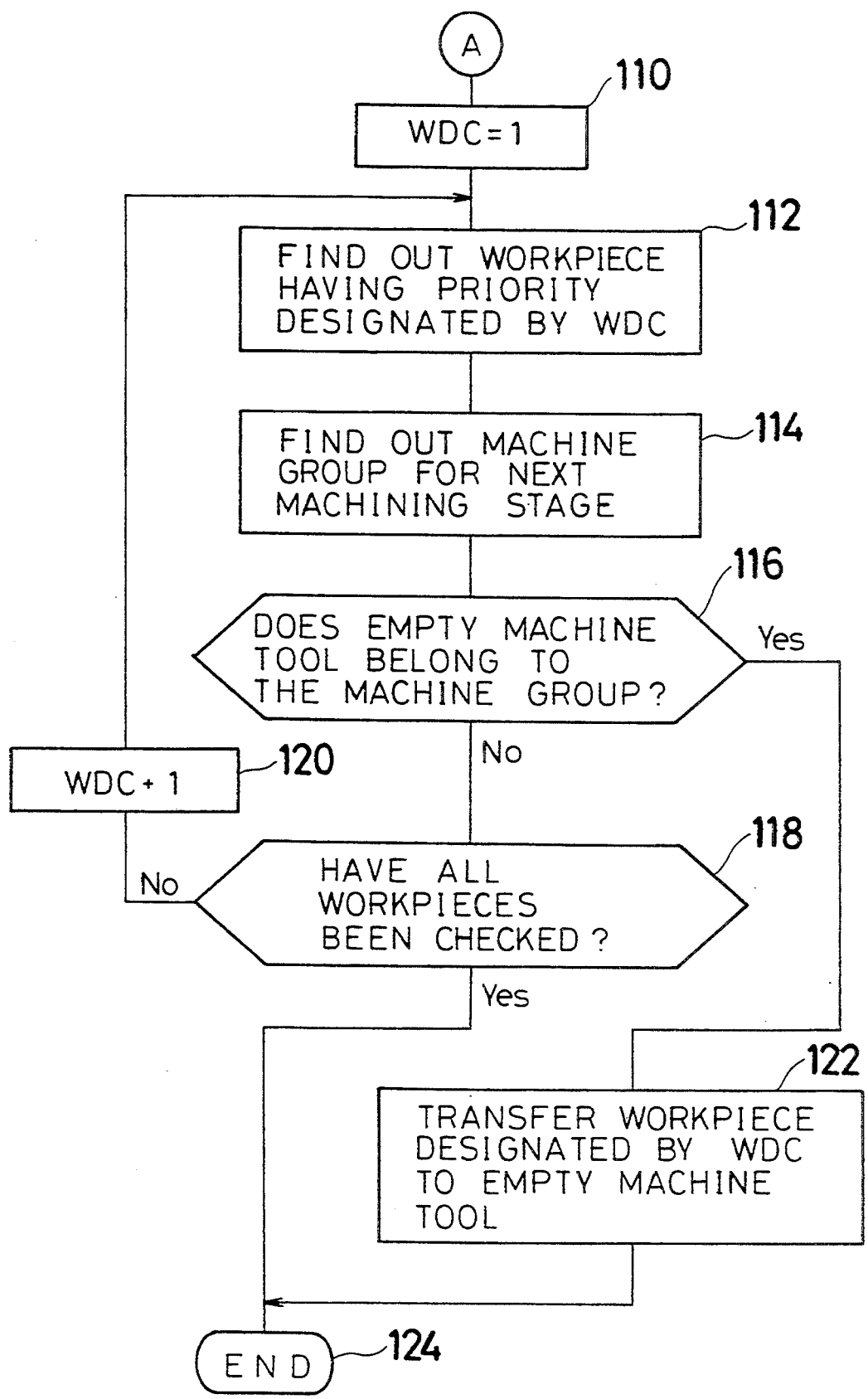

METHOD AND APPARATUS FOR MANAGING A MACHINING SYSTEM

BACKGROUND OF THE INVENTION

1. Field of the Invention

This invention relates to a method and an apparatus for managing a machining system having plural machine tools, workpiece storage for storing plural workpieces and a transfer device selectively transferring workpieces from the workpiece storage to the plural machine tools.

2. Prior Art of the Invention

An example of a conventional machining system in which workpieces are selectively transferred from a workpiece storage to plural machining stations is disclosed in the Japanese Laid Open Patent Publication No. 63-22253. In the machining system, each of the plural machine tools can carry out all kinds of machinings for all kinds of workpieces to be machined in the machining system, thereby improving the flexibility and machining efficiency, and minimizing downtime due to failer of one of the machine tools. Namely, each of the machine tools is provided with many tools which are required to carry out all kinds of machinings for machining all kinds of workpieces. Each of the machine tools, therefore, can succeed the machining operation which has been carried out by another machine tool when the another machine tool has broken down.

In such machining system, since each of the machine tools is required to store all kinds of tools in their tool storage magazines for machining all kinds of workpieces, the number of tools stored in each machine tool increases in proportion to the kinds of workpieces to be machined in the system. The conventional machining system, therefore, has a problem in that it is difficult to machine many kinds of workpieces, because the tool storage magazine of each of the machine tools can store a limited number of tools.

SUMMARY OF THE INVENTION

Accordingly, it is an object of the present invention to provide an improved method and an improved apparatus for managing a machining system to efficiently machine workpieces although each machine tool of the machining system does not store all kinds of tools required to machine the workpieces.

It is another object of the present invention to provide a method and an apparatus for managing a machining system to effectively machine workpieces even when one of machine tools in the machining system breaks down.

Briefly, a method and an apparatus according to the present invention manages a machining system which is provided with a workpiece storage for storing plural workpieces to be machined each of which are machined in plural machining stages, a transfer apparatus and a computer for controlling the transfer operation of the transfer apparatus. The method according to the present invention comprises steps of memorizing in a memory of the computer first information indicating the membership of plural machine tools in plural machine groups corresponding to plural kinds of machinings; memorizing in the memory second information indicating the kinds of workpieces to be machined and machine groups which can carry out the plural kinds of machinings, respectively, for machining the respective workpieces; checking the conditions of the machine tools to find an empty machine tool which requires a new workpiece; finding out one of workpieces stored in the workpiece storage which can be machined by a machine group to which the empty machine belongs; and transferring a workpiece found in the above finding step to the empty machine tool.

An apparatus for managing a machining system according to the present invention comprises memory means for memorizing first information indicating the membership of plural machine tools in plural machine groups corresponding to plural kinds of machinings, and second information indicating the kinds of workpieces to be machined and machine groups which can carry out the plural kinds of machinings, respectively, for machining the respective workpieces; means for checking the condition of the machine tools to find an empty machine tool which requires a new workpiece; means for finding out one of workpieces stored in the workpiece storage which can be machined by a machine group to which the empty machine belongs; and means for transferring a workpiece found by the finding means to the empty machine tool.

Since the memory means of the apparatus memorizes the information indicating which machining operation can be carried out by which machine group and the information indicating the membership of the machine tools in respective machine groups, the apparatus can find one of workpieces stored in the workpiece storage which requires a machining operation by a machine group to which an empty machine tool belongs. With this arrangement, the machining system carries out machining operation efficiently even though each of the machine tool does not store all kinds of tools required to machine all kinds of workpieces.

Further, when one of the machine tools in a machine group breaks down, a new workpiece can be transferred to another machine tool in the same machine group to continue the machining process. The system can therefore efficiently continue the machining operation even in such an abnormal condition.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 2 is a machine information table memorized in a magnetic disc of the machining system shown in FIG. 1;

FIG. 3 is a workpiece information table memorized in the magnetic disc;

FIG. 4 is a workpiece storage information table memorized in the magnetic disc; and FIGS. 5(a) and 5(b) are flowcharts showing the processing of the CPU shown in FIG. 1.

DETAILED DESCRIPTION OF PREFERRED EMBODIMENT

Figure 1:
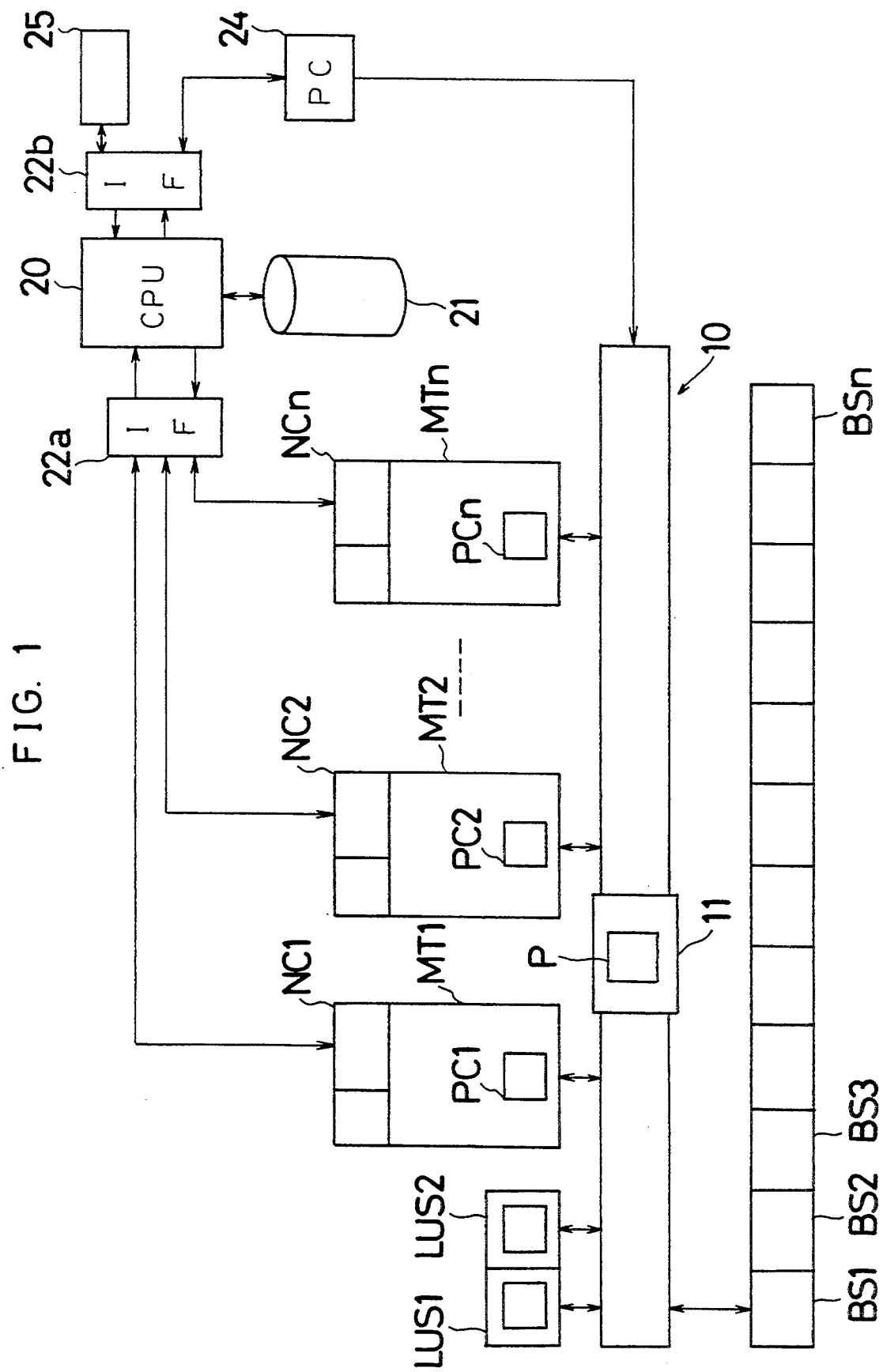
FIG. 1 is a block diagram showing the overall structure of a machining system according to a preferred embodiment of the present invention.

A machining system according a preferred embodiment of the present invention will be explained hereinafter with reference to drawings. In FIG. 1, numeral 10 denotes a transfer line along which a workpiece W mounted on a pallet P is transferred by a transfer vehicle 11, and plural numerically controlled machine tools MT1, MT2 . . . MTn are installed at one side of the transfer line. These machine tools MT1-MTn are each equipped with pallet exchange devices PC1, PC2 . . . PCn, respectively, to carry pallets between the respective machine tools MT1-MTn and the transfer vehicle 11.

Loading/unloading stations LUS1 and LUS2 are also arranged at the same side of the transfer line at which the machine tools MT1-MTn are arranged. An operator attaches new workpieces on pallets P, and detaches machined workpieces from pallets P at the loading/unloading stations LUS1 and LUS2. Arranged along the other side of the transfer line is a workpiece storage composed of plural buffer stations BS1-BSn at which many pallets are stored. Workpieces mounted on theses pallets include new workpieces, machined workpieces, and half-machined workpieces.

New workpieces W mounted on pallets P at the loading/unloading stations LUS1 and LUS2 are transferred to the buffer stations BS1-BSn by the transfer vehicle 11, while machined workpieces at the buffer stations BS1-BSn are transferred to the loading/unloading stations LUS1 and LUS2 for removal of the workpieces W.

Numeral 20 denotes a central processing unit (hereinafter referred to as "CPU") of a control apparatus of the machining system, and a magnetic disc 21 and interface circuits 22a and 22b are connected to the CPU 20. Numerical controllers NC1-NCn, which are mounted on the respective machine tools MT1-MTn to control them, are connected to the CPU 20 through the interface circuit 22a so that numerical control data are transferred from the CPU 20 to the numerical controllers NC1-NCn. Connected to the interface circuit 22b are a sequence controller 24 which mainly controls the transfer vehicle 11 and the pallet exchange devices PC1-PCn, and an operation panel 25 having a CRT display, a keyboard, command switches and the like.

The sequence controller 24 memorizes therein a sequence control program for moving the transfer vehicle to a position designated by a command signal output from the CPU 20, and for controlling the pallet exchange devices PC1-PCn to transfer pallets between the transfer vehicle 11 and the machine tools MT1-MTn.

In the magnetic disc 21, a machine information table MIT, a workpiece information table WIT and a workpiece storage information table WSIT are formed, and an operator inputs required information into these tables through the operation panel 25.

As shown in FIG. 2, memorized in the machine information table MIT are machine group numbers and machine names belonging to respective machine groups. In this example, machine tools MT1, MT2, MT3 and MT4 belong to the machine group 01. This machine group 01 is used for ordinary machinings which can be carried out with tools which are provided in each of the machine tools MT1, MT2, MT3 and MT4. The machine tools MT1 and MT2 belong to the machine group 02 for one of special machinings which can be carried out only with tools provided in the machine tools MT1 and MT2, and the machine tools MT3 and MT4 belong to the machine group 03 for another special machining which can be carried out only with tools provided in the machine tools MT3 and MT4. Similarly, the machine tools MT1 belongs to the machine group 04 for another machining which can be carried out by tools provided in the machine tool MT1.

As shown in FIG. 3, memorized in the workpiece information table WIT are workpiece numbers, parts numbers, posture numbers, machining stage numbers, machine group numbers and numerical control data numbers. For example a workpiece 01 whose part number is 111—111 is machined in two postures, and in each of the first and second postures the workpiece 01 is machined in three machining stages. The machining in the first stage in the first posture and the machining in the first stage in the second posture can be carried out by machine tools in the machine group 01, and the machining in the second stage in the first posture and the machining in the second stage in the second posture can be carried out by machine tools in the machine group 02. The machining in the third stage in the first posture can be carried out by machine tools in the machine group 03, while the machining in the third stage in the second posture can be carried out by machines in the machine group 04.

FIG. 4 shows the workpiece storage information table WSIT which memorizes the station numbers of respective buffer stations BS1-BSn, the workpiece numbers of workpieces located at respective buffer stations BS1-BSn, the postures and next machining stages of respective workpieces and the machining priority of the workpieces. When the machining is completed, a mark "*" is written in the data areas for the machining stage and machining priority.

Figure 5A:
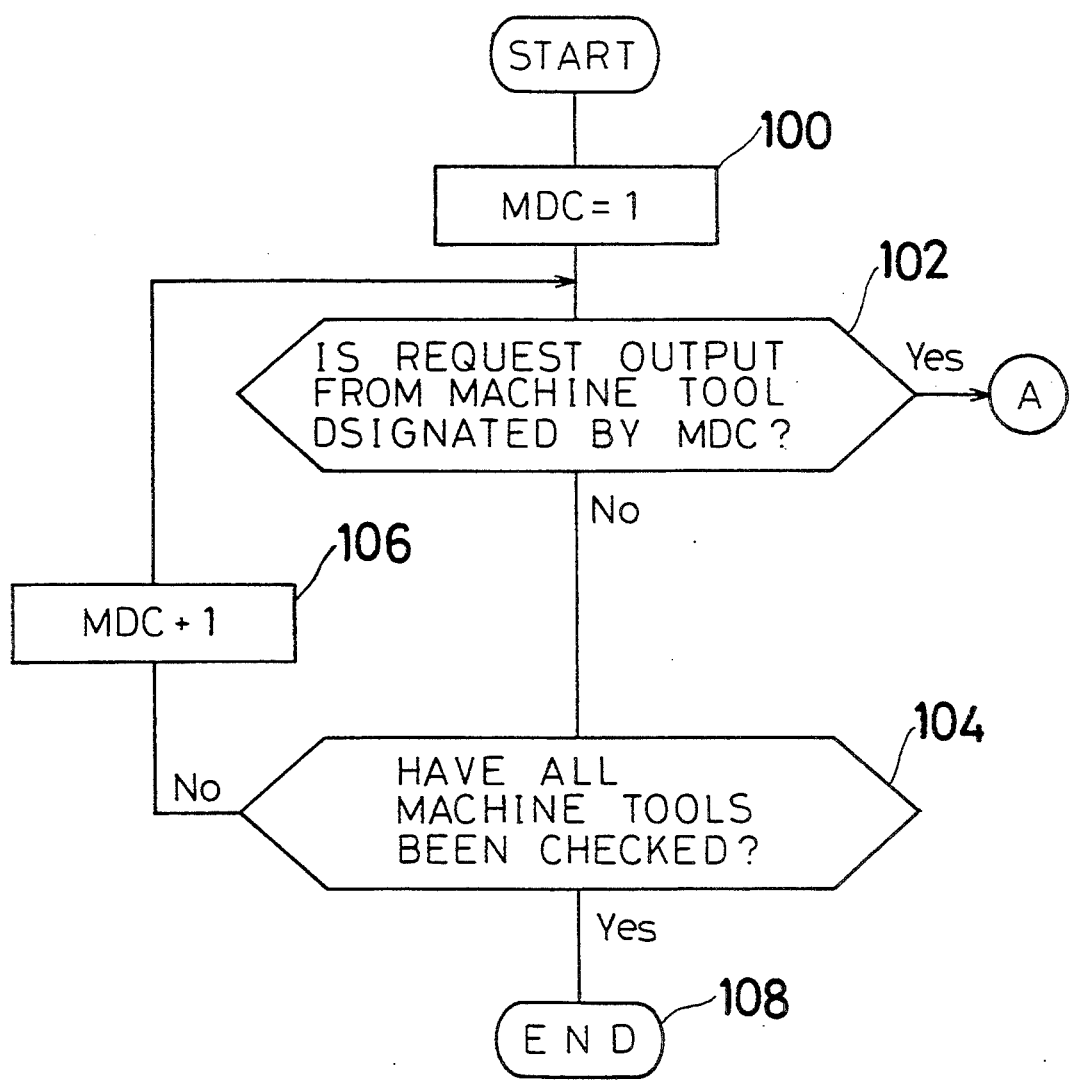

The processing of the CPU 20 will be described hereinafter with reference to the flowcharts shown in FIGS. 5 (a) and 5 (b). The CPU 20 repeatedly executes the processing shown in FIGS. 5 (a) and 5 (b) at a predetermined interval.

At first step 100, a machine designating counter MDC designating one of machine tools MT1-MTn is initially reset to "1", and it is judged at next step 102 whether or not a machine tool designated by the counter MDC outputs a transfer request signal, which indicates that previous machining has finished and the transfer of a new workpiece is required, i.e., the machine tool is empty. A machine tool outputting a transfer request signal will be referred to as "empty machine tool". In this case, it is judged whether or not the machine tool MT1 is empty, because the counter MDC designates the machine tool MT1. When the machine tool MT1 does not output any transfer request signal, the process moves to step 104 at which it is judged whether or not all of the machine tools have been checked. If the answer is "No", the processing moves to step 106 at which the counter MDC is incremented, and then moved back to the step 102 to repeat same processing to check whether or not the machine tool MT2 outputs a transfer request signal, i.e., the machine tool MT2 is empty. When the machine tool MT2 does not output any transfer request signal, the processing at the step 102 is repeated after the counter MDC is incremented at the step 106. With this processing, all of the machine tools MT1-MTn are sequentially checked. When the checking operation for all machine tools has finished, the processing ends at step 108. On the contrary when one of the machine tools MT1-MTn is empty, the processing moves from the step 102 to step 110 in FIG. 5 (b) to execute processing at step 110 and the following steps so as to find out a workpiece which can be machined by the empty machine tool outputting the transfer request signal. Namely, a workpiece designating counter WDC is initially reset to "1" at step 110, and, at step 112, a workpiece having a machining priority designated by the counter WDC, i.e., a workpiece having the highest priority is found out based upon the information in the workpiece storage information table WSIT. Then the posture and next machining stage of the workpiece are found out based upon the data in the workpiece storage information table WSIT. At next step 114, a machine group is found out, with reference to the workpiece information table WIT, which can carry out machining in the next machining stage of the workpiece. When the empty machine tool belongs to the machine group which can carry out the machining at the next machining stage, the processing moves from the step 116 to step 122 at which the workpiece having a machining priority designated by the counter WDC is transferred to the empty machine tool. On the contrary, when it is judged that the workpiece having a highest priority can not be machined by a machine group to which the empty machine tool belongs, the processing moves from the step 116 to step 118 at which it is judged whether or not all of the workpieces have been checked. If the answer is "No", the processing moves to step 120 at which the counter WDC is incremented, and then moves back to the step 112 to repeat the above-described operation to check other workpieces having lower machining priorities. When the checking operation for all workpieces is finished, the processing ends at step 124.

With the above-described processing, a workpiece which can be machined by an empty machine tool is found out, and is then transferred to the empty machine tool.

Assuming that the machine tool MT2 has finished a previous machining and outputs a transfer request signal, the CPU 20 detects the output of the transfer request signal at the step 102, and the count value of the counter MDC, i.e., "2" is memorized as the machine number of an empty machine. After that, all workpieces are checked, in the order of their machining priorities, at steps 110 through 120 to find out a workpiece which can be machined by the machine tool MT2. As is clear from the information tables MIT, WIT and WSIT, the machine tool MT2 belongs to the machine groups 01 and 02, and workpieces located at buffer stations BS1 and BS3 can be machined by machine tools in the machine groups 01 and 02, respectively. Since the workpiece at the buffer station BS1 has higher machining priority than that of the workpiece at buffer station BS3, the workpiece at buffer station BS1 is transferred to the machine tool MT2. Numerical control data Q1201 is also transmitted to the numerical controller NC2 to be executed by the numerical controller NC2. After the completion of the machining in accordance with the numerical control data Q1201, the workpiece is returned to the one of the buffer stations. The above mentioned processing is repeated to machine all workpieces at buffer stations BS1-BSn.

When one of the machine tools MT1-MTn has broken down, the broken machine tool does not output any transfer request signal. In this case, the machinings which have been carried out by the broken machine are carried out by other machines which belong to a machining group or machine groups to which the broken machine tool belongs.

The processing of the CPU 20 may be modified to transfer a half-machined workpiece directly to other machine tool without storing it in the workpiece storage area, when the other machine can carry out machining in the following machining stage thereof.

Obviously, numerous modifications and variations of the present invention are possible in light of the above teachings. It is therefore to be understood that within the scope of the appended claims, the present invention may be practiced otherwise than as specifically described herein.

What is claimed is:

1. A computer implemented method of managing a machining system which is provided with plural machine tools, a workpiece storage for storing plural workpieces, a transfer apparatus for selectively transferring said workpieces between said workpiece storage and said machine tools and a computer for controlling the transfer operation of said transfer apparatus, said method comprising steps of:

memorizing in a memory of the computer first information indicating membership of said machine tools in plural machine groups corresponding to plural kinds of machinings;

memorizing in said memory second information indicating the kinds of workpieces to be machined and machine groups which can carry out said plural kinds of machinings, respectively, for machining said workpieces, respectively;

checking the conditions of said machine tools to find an empty machine tool which requires a new workpiece;

finding out one of workpieces stored in said workpiece storage which can be machined by a machine group to which said empty machine belongs; and using the computer for controlling the transfer of a workpiece found in said finding step to said empty machine tool.

2. A method of managing a machining system according to claim 1, wherein each of said workpieces is machined in plural machining stages by plural kinds of machinings, and wherein information regarding machine groups are inputted for respective machining stages of each of said workpieces at said second information memorizing step and a workpiece is found at said finding step whose next machining step can be carried out by said empty machine tool.

3. A method of managing a machining system according to claim 1, wherein said method further comprises a step of memorizing said memory information regarding machining priorities of respective workpieces stored in said workpiece storage, and wherein a workpiece having a highest machining priority is preferentially transferred to said empty machine tool when plural workpieces can be machined by said empty machine.

4. An apparatus for managing a machining system which is provided with plural machine tools, a workpiece storage for storing plural workpieces, a transfer apparatus for selectively transferring said workpieces between said workpiece storage and said machine tools and a computer for controlling the transfer operation of said transfer apparatus, said apparatus comprising:

memory means for memorizing first information indicating membership of said machine tools in plural machine groups corresponding to plural kinds of machinings, and second information indicating the kinds of workpieces to be machined and machine groups which can carry out said plural kinds of machinings, respectively, for machining said workpieces, respectively;

means for checking the conditions of said machine tools to find an empty machine tool which requires a new workpiece;

means for finding out one of workpieces stored in said workpiece storage which can be machined by a machine group to which said empty machine belongs; and means for transferring a workpiece found by said finding means to said empty machine tool.

5. An apparatus for managing a machining system according to claim 4, wherein said workpieces are machined in plural machining stages by plural kinds of machinings, and wherein said memory means further memorizes information regarding machine groups for respective machining stages of each of said workpieces, and said finding means finds a workpiece whose next machining stage can be carried out by said empty machine tool.

6. An apparatus for managing a machining system according to claim 5, wherein said memory means further memorizes information regarding machining priorities or respective workpieces stored in said workpiece storage, and said finding means finds a workpiece having a highest machining priority when plural workpieces can be machined by said empty machine.

7. A computer implemented method of managing a machining system which is provided with plural machine tools, a workpiece storage for storing plural workpieces, a transfer apparatus for selectively transferring said workpieces between said workpiece storage and said machine tools and a computer for controlling the transfer operation of said transfer apparatus, said method comprising the steps of:

memorizing in a memory of the computer first information indicating membership of said machine tools in plural machine groups corresponding to plural kinds of machinings, said plural machine groups being composed of a first machine group which includes plural machine tools available for various ordinary machinings and at least one other machine group which includes plural machine tools available for a special machining, at least one of said plural machine tools of said at least one other machine group also belonging to said first machine group;

memorizing in said memory second information indicating the kinds of workpieces to be machined, said second information also indicating, for each workpiece to be machined, machining stages through which each workpiece is to be moved sequentially for completion of each workpiece, and machine groups which are designated in correspondence respectively to said machining stages;

checking the conditions of said machine tools to find an empty machine tool which requires a new workpiece;

finding out one of workpieces stored in said workpiece storage which can be machined by a machine group to which said empty machine tool belongs; and using the computer for controlling the transfer of a workpiece found in said finding step to said empty machine tool.

8. A method of managing a machining system according to claim 7, wherein for each workpiece to be machined, said second information also indicates a number of postures which each workpiece to be machined has to take during machinings in said machine tools, and wherein said machining stages and said machine groups designated in correspondence respectively to said machining stages are designated for each of said postures.

9. A method of managing a machining system according to claim 7, wherein for each workpiece to be machined, said second information also indicates a number of numerical control data which are designated in correspondence respectively to said machining stages designated for each said workpiece to be machined, and wherein said method further comprises the step of:

transmitting to said empty machine tool numerical control data which corresponds to one of said machining stages for said workpiece found in said finding step when said workpiece found in said finding step is transferred to said empty machine tool.

10. An apparatus for managing a machining system which is provided with plural machine tools, a workpiece storage for storing plural workpieces, a transfer apparatus for selectively transferring said workpiece between said workpiece storage and said machine tools and a controller for controlling the transfer operation of said transfer apparatus, wherein said controller comprises;

first memory means for memorizing first information indicating membership of said machine tools in plural machine groups corresponding to plural kinds of machinings, said plural machine groups being composed of a first machine group which includes plural machine tools available for various ordinary machining and at least one other machine group which includes plural machine tools available for a special machining, at least one of said plural machine tools of said at least one other machine group also belonging to said first machine group;

second memory means for storing second information indicating the kinds of workpieces to be machined, said second information also indicating, for each workpiece to be machined, machining stages through which each workpiece is to be moved sequentially for completion of each workpiece, and machine groups which are designated in correspondence respectively to said machining stages;

means for checking the conditions of said machine tools to find an empty machine tool which requires a new workpiece;

means for finding out a workpiece stored in said workpiece storage which can be machined by a machine group to which said empty machine tool belongs; and means for controlling said transfer apparatus so as to transfer a workpiece found in said finding step to said empty machine tool.

11. An apparatus for managing a machining system according to claim 10, wherein for each workpiece to be machined, said second information also indicates a number of postures which each workpiece to be machined has to take during machinings in said machine tools, and wherein said machining stages and said machine groups designated in correspondence to said machining stages are designated for each of said postures.

12. An apparatus for managing a machining system according to claim 10, wherein for each workpiece to be machined, said second information also indicates a number of numerical control data which are designated in correspondence respectively to said machining stages designated for each said workpiece to be machined, and wherein said controller further comprises:
  means for transmitting to said empty machine tool numerical control data which corresponds to one of said machining stages for said workpiece found in said finding means when said workpiece found in said finding means is transferred to said empty machine tool.

* * * * *